United States Patent [19]

Shalaby

[11] Patent Number: 5,118,581
[45] Date of Patent: Jun. 2, 1992

[54] PROTECTION OF GAMMA TITANIUM ALUMINIDES WITH ALUMINOSILICATE COATINGS

[75] Inventor: Hoda Shalaby, Arcadia, Calif.

[73] Assignee: Rockwell International Corporation, El Segundo, Calif.

[21] Appl. No.: 558,945

[22] Filed: Jul. 26, 1990

[51] Int. Cl.$^5$ .................... B32B 7/00; C03C 27/02
[52] U.S. Cl. ................... 428/433; 65/18.1; 65/59.1; 65/60.5; 65/60.8; 156/89; 156/151; 427/419.7; 428/698
[58] Field of Search ............... 65/18.1, 159.1, 59.22, 65/60.1, 60.5, 60.8; 156/150, 89, 151, 272.2, DIG. 75; 427/419.6, 419.7; 428/433, 698

[56] References Cited

U.S. PATENT DOCUMENTS

| | | | |
|---|---|---|---|
| 2,467,114 | 4/1949 | Deyrup | 427/376.4 X |
| 3,088,201 | 5/1963 | Louden et al. | 65/59.22 X |
| 3,689,943 | 10/1972 | Colantuono | 427/318 |
| 4,172,922 | 10/1979 | Merz et al. | 428/433 X |
| 4,369,233 | 1/1983 | Schaik | 427/253 X |
| 4,536,435 | 8/1985 | Utsumi et al. | 428/433 X |
| 4,921,738 | 5/1990 | Cassidy | 428/433 X |

Primary Examiner—Robert L. Lindsay
Attorney, Agent, or Firm—Lawrence N. Ginsberg; Charles T. Silberberg

[57] ABSTRACT

A method and composition for protecting a gamma titanium aluminide alloy specimen subject to high temperature oxidation is disclosed. An alumino silicate glass coating is applied on the surface of the gamma titanium aluminide specimen. The coated specimen is heated to a temperature in a range of 2150°–2250° F. for a sufficient time period to form a silicide interfacial layer between the alloy and the glass coating. The glass coating is preferably a composition including $SiO_2$ in a weight percentage of 60 to 65 $Al_2O_3$ in a weight percent of 16 to 20. The glass coating results in minimal oxidation.

24 Claims, 1 Drawing Sheet

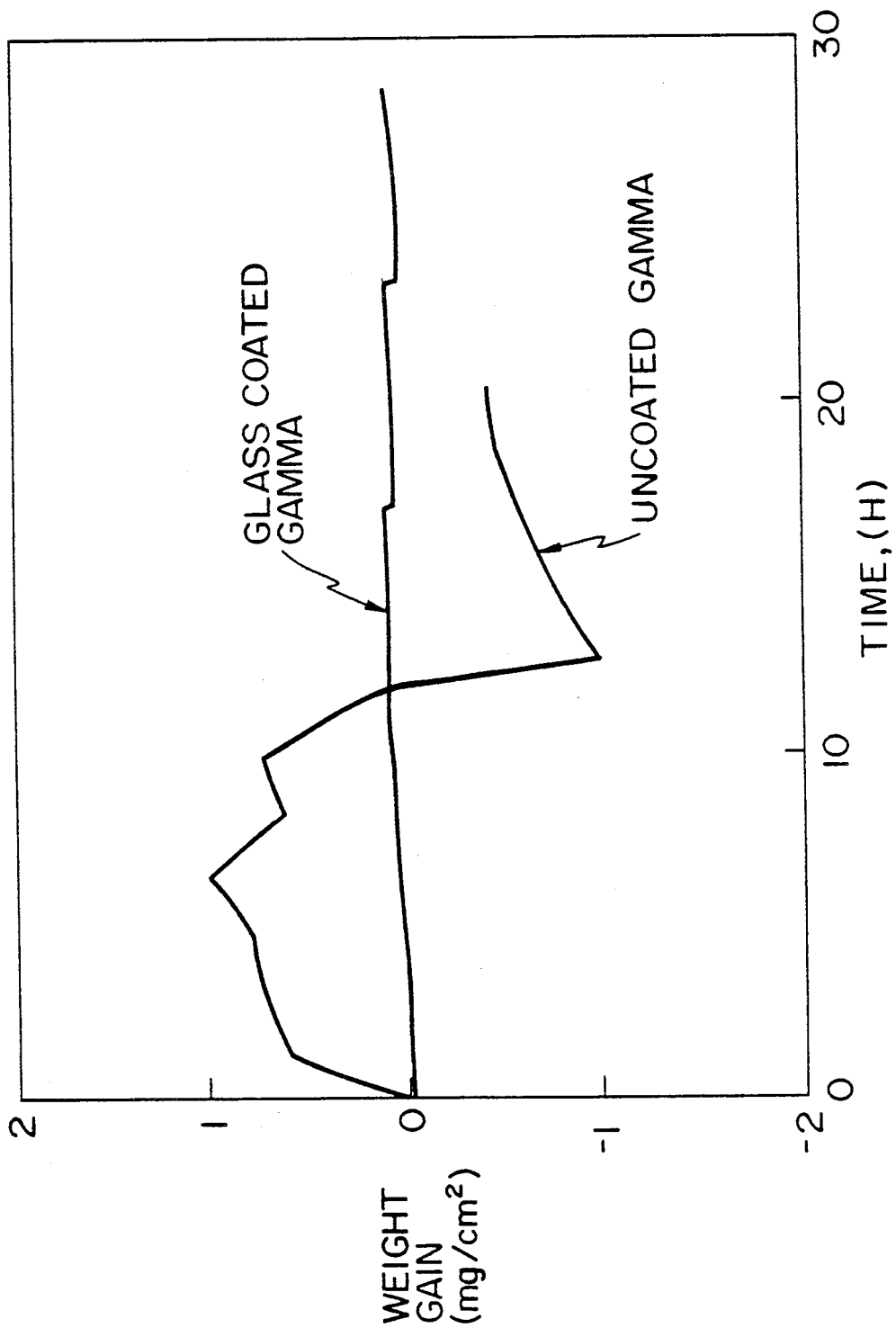

PROTECTION OF GAMMA TITANIUM ALUMINIDES WITH ALUMINOSILICATE COATINGS

STATEMENT OF GOVERNMENT INTEREST

This invention was made with Government support under Contract No. F33657-86-C-2127 awarded by the U.S. Air Force. The Government has certain rights in this invention.

BACKGROUND OF THE INVENTION

1. Field of the Invention

This invention relates to the protection of gamma titanium aluminide alloy structures and more particularly to protective coatings for such structures.

2. Description of the Related Art

Titanium aluminide intermetallics are attractive for use in advanced structural applications such as aircraft systems, because they offer a desirable combination of low density and high temperature strength. At high temperatures, however, titanium aluminides presently have very limited use because of their poor oxidation resistance.

U.S. Pat. No. 4,369,233, issued to Teunis van Schaik, entitled "Process to Apply a Protecting Silicon Containing Coating On Specimen Produced From Superalloys and Product", discloses a corrosion resistant coating for use on a super alloy substrate (a nickel based alloy). The silicon coating is comprised of $Ti_6 Si_7 Ni_{16}$. The Ti layer is applied by ion plating. It is diffused in the super alloy and a Si layer is applied by a pack coat process.

U.S. Pat. No. 2,467,114, issued to A. J. Deyrup, entitled "Vitreous Coatings For Light Metals", discloses use of a coating, primarily comprised of PbO, $SiO_2$, and $Li_2O$, on aluminum and aluminum rich alloys.

U.S. Pat. No. 3,698,943, issued to W. R. Colantuono, entitled "Protective Coating", discloses use of a protective coating for hot metal workpieces, particularly high-speed tool steels. The coating consists of sodium borate, silica and a viscosity-promoting agent, such as alumina.

OBJECTS AND SUMMARY OF THE INVENTION

The principle object of the present invention is to protect gamma titanium aluminide alloy workpieces against high temperature oxidation.

Another object of the invention is to provide a lightweight protective surface coating for high temperature gamma titanium aluminide alloys.

Another object of the invention is to provide a protective coating for gamma titanium aluminide alloys that provides the required protection against scaling and decarborization at the high temperatures incident to billet production, and yet adheres to the workpiece at the substantially lower temperatures of the ingots at the time the coating is applied.

The present invention for protecting a gamma titanium aluminide alloy specimen subject to high temperature oxidation comprises the application of an aluminosilicate glass coating on a surface of the gamma titanium aluminide specimen. The coated specimen is heated to a temperature in a range of 2150°–2250° F. for a sufficient time period to form a silicide interfacial layer between the alloy and the glass coating.

The glass coating is preferably a composition including $SiO_2$ in a weight percentage of 60 to 65 and $Al_2O_3$ in a weight percent of 16 to 20. The glass coating results in minimal oxidation.

Other objects, advantages and novel features of the present invention will become apparent from the following detailed description of the invention when considered in conjunction with the accompanying drawings.

BRIEF DESCRIPTION OF THE DRAWINGS

The sole FIGURE is a graph of weight gain versus time for a test specimen glass coated in accordance with the present invention and subjected to high temperature thermal cyclic conditions.

DETAILED DESCRIPTION OF THE PREFERRED EMBODIMENTS

In the practice of the present invention, the glass coating comprises a composition having aluminosilicate. Silica ($SiO_2$) is preferably present in the coating within the range of 60 to 65 percent by weight. Alumina ($Al_2O_3$) is present, preferably within the range of 16 to 20 percent by weight. Boric acid ($B_2O_3$), sodium oxide ($Na_2O$), magnesium oxide (MgO), and calcium oxide (CaO), preferably provide the remainder of the glass coating. Thus, the preferred composition range can be expressed as follows:

|  | Weight percent |
| --- | --- |
| $SiO_2$ | 60 to 65 |
| $Al_2O_3$ | 16 to 20 |
| $B_2O_3$ | 0 to 6 |
| $Na_2O$ | 0 to 2 |
| MgO | 5 to 8 |
| CaO | 7 to 10 |

The optimal composition can be expressed as follows:

|  | Weight percent |
| --- | --- |
| $SiO_2$ | 62 |
| $Al_2O_3$ | 17 |
| $B_2O_3$ | 5 |
| $Na_2O_3$ | 1 |
| MgO | 7 |
| CaO | 8 |

The subject glass coating is preferably applied by conventional airbrush techniques. This is preferred because it is scalable and cost efficient. However, the coating may be applied by other suitable methods such as plasma spraying or sol gel methods. The aluminosilicate glass coating is applied to a thickness of 0.5 mils to 2 mils, preferably about 0.5 mils.

It is necessary that the coated specimen be heated for a sufficient time period to form a silicide interfacial layer between the alloy and the glass coating. In order to form an adequate interfacial layer, the specimen should be heating to a temperature in a range between 2150° and 2250° F. The glass coating is preferably heated for a minimum of approximately 10 minutes. (The range is typically between 10–20 minutes.) High temperature processing requires a short time period while lower temperatures require a longer time period. The resulting interfacial layer remains unchanged after cyclic oxidation.

EXAMPLE

A 1 Cm square titanium aluminide specimen was mechanically cleaned. A glass coating was applied by airbrushing.

The titanium aluminide specimen had the following composition:

|    | By Atom Percent |
|----|-----------------|
| Ti | 49.2            |
| Al | 48.0            |
| Nb | 2.5             |
| Ta | 0.3             |

The coated specimen was then held at 2150° F. for 10 minutes in order to obtain a coherent and continuous layer. The oxidation experiment was then carried out under thermal cyclic onditions (2 hrs. at 1800° F.—2 hrs. at room temperature). The weight gain or loss was monitored. An uncoated titanium aluminide specimen was exposed to the same thermal cyclic conditions. As illustrated in the FIG., the specimen with the glass coating exhibited substantially no weight change while the uncoated specimen had a substantial weight loss. Examination of the coated specimen by scanning electron microscopy (SEM), indicated the formation of an interfacial silicide layer between the coating and the titanium aluminide during processing which remains unchanged after cyclic oxidation. No cracks were observed in the coating or after thermal cyclic conditions, when examined by SEM.

Obviously, many modifications and variations of the present invention are possible in light of the above teachings. It is, therefore, to be understood that within the scope of the appended claims, the invention may be practiced otherwise than as specifically described.

What is claimed and desired to be secured by letters patent of the United States is:

1. A process for protecting a gamma titanium aluminide alloy specimen subject to high temperature oxidation, comprising the steps of:
   (a) applying an aluminosilicate glass coating on a surface of said gamma titanium aluminide specimen; and
   (b) heating the coated specimen to a temperature in a range of 2150°-2250° F. for a sufficient time period to form a silicide interfacial layer between said alloy and said glass coating.

2. The process of claim 1 wherein said step of applying includes airbrushing said coating on said specimen.

3. The process of claim 1 wherein said glass coating is formed of a composition which comprises:

|        | Weight percent |
|--------|----------------|
| $SiO_2$  | 60 to 65       |
| $Al_2O_3$| 16 to 20       |
| $B_2O_3$ | 0 to 6         |
| $Na_2O$  | 0 to 2         |
| MgO    | 5 to 8         |
| CaO    | 7 to 10        |

4. The process of claim 3 wherein said composition comprises:

|        | Weight percent |
|--------|----------------|
| $SiO_2$  | 62             |
| $Al_2O_3$| 17             |
| $B_2O_3$ | 5              |
| $Na_2O_3$| 1              |
| MgO    | 7              |
| CaO    | 8              |

5. The process of claim 1 wherein said aluminosilicate glass coating is applied in a thickness of 0.5 mils to 2 mils.

6. The process of claim 1 wherein said aluminosilicate glass coating is applied to a thickness of 0.5 mils.

7. The process of claim 1 wherein said step of applying includes plasma spraying said coating on said specimen.

8. The process of claim 1 wherein said step of applying includes application of said coating by sole gel method.

9. The process of claim 1 wherein said step of heating includes heating to a temperature of approximately 2150° F.

10. The process of claim 1 wherein said step of heating includes heating for a minimum period of 10 minutes.

11. A process for forming low density, high temperature strength structural component comprising the steps of:
   (a) providing a gamma titanium aluminide alloy specimen;
   (b) applying an aluminosilicate glass coating on a surface of said gamma titanium aluminide specimen; and
   (c) heating the coated specimen to a temperature in a range of 2150°-2250° F. a sufficient time period to form a silicide interfacial layer between said alloy and said coating.

12. The process of claim 11 wherein said step of applying includes airbrushing said coating on said specimen.

13. The process of claim 11 wherein said glass coating is formed of a composition which comprises:

|        | Weight percent |
|--------|----------------|
| $SiO_2$  | 60 to 65       |
| $Al_2O_3$| 16 to 20       |
| $B_2O_3$ | 0 to 6         |
| $Na_2O$  | 0 to 2         |
| MgO    | 5 to 8         |
| CaO    | 7 to 10        |

14. The process of claim 13 wherein said composition comprises:

|        | Weight percent |
|--------|----------------|
| $SiO_2$  | 62             |
| $Al_2O_3$| 17             |
| $B_2O_3$ | 5              |
| $Na_2O_3$| 1              |
| MgO    | 7              |
| CaO    | 8              |

15. The process of claim 11 wherein said aluminosilicate glass coating is applied in a thickness of 0.5 mils to 2 mils.

16. The process of claim 11 wherein said aluminosilicate glass coating is applied to a thickness of 0.5 mils.

17. The process of claim 11 wherein said step of applying includes plasma spraying said coating on said specimen.

18. The process of claim 11 wherein said step of applying includes application of said coating by sole gel method.

19. The process of claim 11 wherein said step of heating includes heating to a temperature of approximately 2150° F.

20. The process of claim 11 wherein said step of heating includes heating for a minimum period of 10 minutes.

21. A composition suitable for use as a protective coating on gamma titanium aluminide alloys subject to high temperature oxidation, comprising:
an aluminosilicate glass coating formed on a surface of said gamma titanium aluminide alloy.

22. The composition of claim 21 wherein said aluminosilicate glass coating is formed of a composition which comprises:

|  | Weight percent |
| --- | --- |
| $SiO_2$ | 60 to 65 |
| $Al_2O_3$ | 16 to 20 |
| $B_2O_3$ | 0 to 6 |
| $Na_2O$ | 0 to 2 |
| MgO | 5 to 8 |
| CaO | 7 to 10 |

23. The composition of claim 22 wherein said aluminosilicate glass coating comprises:

|  | Weight percent |
| --- | --- |
| $SiO_2$ | 62 |
| $Al_2O_3$ | 17 |
| $B_2O_3$ | 5 |
| $Na_2O_3$ | 1 |
| MgO | 7 |
| CaO | 8 |

24. An intermetallic, low density, high strength structural component, comprising:
(a) a gamma titanium aluminide alloy substrate; and
(b) an aluminosilicate glass coating formed on said substrate.

* * * * *